April 12, 1938.  W. VON NESSEN  2,114,260
HANDLE FOR GLASSWARE
Filed July 3, 1936
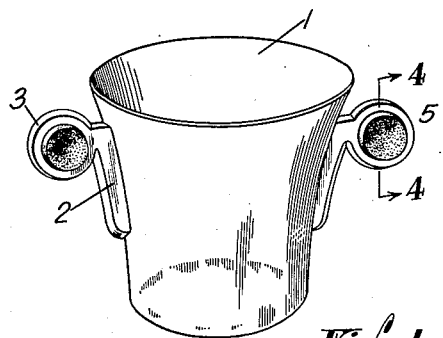
Fig. 1
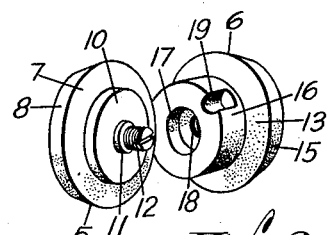
Fig. 2
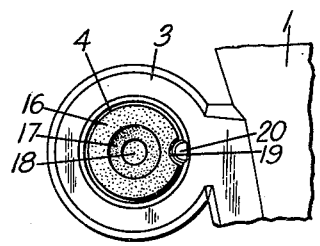
Fig. 3
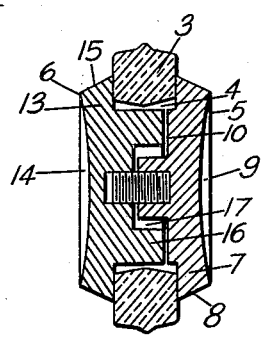
Fig. 4
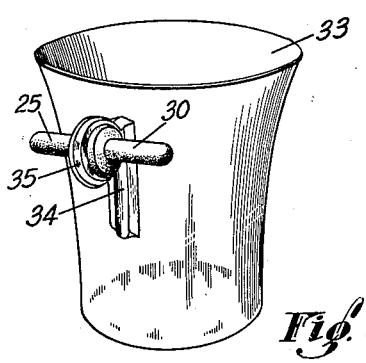
Fig. 5
Fig. 6
Fig. 7
INVENTOR.
Walter Von Nessen.
BY
ATTORNEYS.

Patented Apr. 12, 1938

2,114,260

UNITED STATES PATENT OFFICE 2,114,260

HANDLE FOR GLASSWARE

Walter von Nessen, New York, N. Y., assignor to A. H. Heisey & Company, Newark, Ohio, a corporation of Ohio Application July 3, 1936, Serial No. 88,860

1 Claim. (Cl. 65—13)

My invention relates to handles for glassware. It relates more particularly to the provision of handles for glassware which are much more attractive than those usually provided and which can be gripped more readily, although it is not necessarily limited thereto.

One of the objects of my invention is to provide a handle structure which may be easily attached to ordinary glassware handles in order to impart to the handles a much more pleasing appearance and in order to produce a composite handle structure which can be more readily gripped than the ordinary handle structure.

Another object of my invention is to provide a handle structure of the type described which not only can be easily attached to the ordinary glassware handle but may be easily and quickly removed therefrom if desired.

Another object of my invention is to provide a handle structure of the type indicated which is very simple in structure and inexpensive to manufacture.

In its preferred form my invention contemplates the provision of a handle structure which is adapted to be removably attached to the ordinary handle provided on glassware, for example, to the handles of a glass sugar bowl or to the handle of a glass cream pitcher. This handle structure is preferably made of two parts which interfit and which are adapted to be positioned in the opening usually provided in the glass handle. These two parts cooperate with each other to produce a composite handle structure which is much more pleasing in appearance than the ordinary handle structure and which can be gripped much more effectively than the ordinary handle structure. The two parts of the handle structure which are attached to the ordinary glass handle are preferably of different material from the article to which they are applied and may be of different color in order to increase the ornamental effect.

The preferred embodiment of my invention is illustrated in the accompanying drawing wherein similar characters of reference designate corresponding parts and wherein:

Figure 1 is a perspective view of a glass sugar bowl having the handle structures which I provide applied to the glass handles thereof.

Figure 2 is a perspective view of the two parts of the handle structure which I provide.

Figure 3 is a side elevation of the glass handle provided on the article, showing one part of my handle structure positioned in the opening in the glass handle.

Figure 4 is a transverse section taken through the composite handle structure substantially along line 4—4 of Figure 1.

Figure 5 is a perspective view of a glass article with a handle structure of slightly different form applied to the glass handle thereof.

Figure 6 is a perspective view of the two parts of my handle structure which is shown applied to the article in Figure 5.

Figure 7 is a view partly in section and partly in side elevation, showing how this handle structure cooperates with the ordinary glass handle of the article.

With reference to the drawing and particularly to Figures 1 to 4, inclusive, I have illustrated one form of handle structure which I preferably provide and which is adapted to be applied to the ordinary handle provided on glassware. This handle imparts to the ordinary glassware handle a much more pleasing appearance and makes it easier to grip.

I have shown a glass article 1 which takes the form of a sugar bowl provided with a pair of integral glass handles 2 of ordinary construction. These glass handles 2 include an annular gripping portion 3 having a circular opening 4 formed therein in the usual manner. The handle structure which I provide is adapted to be positioned in this opening 4.

As illustrated best in Figures 2 and 4, this handle structure comprises a button-like member 5 and a second similar member 6. These members 5 and 6 are preferably made of material different from that of the article, for example, of bakelite or similar material. The button 5 comprises a disk-like body portion 7 having a bevelled edge 8 and a concave outer surface 9. The inner surface has a centrally disposed boss 10 formed thereon which is of cylindrical form, being of slightly less diameter than the body portion 7. A second boss 11 of cylindrical form but of considerably less diameter than the boss 10 projects from the boss 10 and is centrally disposed thereon. This boss 11 has a screw 12 disposed centrally in a socket formed therein and the screw is secured therein in any suitable manner. The screw 12 projects from the boss a substantial distance.

The other member 6 comprises a disk-like body portion 13 having a concave outer surface 14 and a bevelled edge 15. A cylindrical boss 16 is formed on the inner surface of the body portion 13. This boss 16 is of slightly less diameter than the outer portion 13 and projects from the body portion a considerable distance. It is centrally disposed on the body portion and is of substantially the same diameter as the boss 10 on member 5. The boss 16 has an annular socket 17 formed therein which is adapted to receive the boss 11 formed on member 5. In communication with the lower end of the socket 17 is a socket 18 of much less diameter which is threaded to receive the end of the screw 12.

In positioning this handle structure in the opening 4 in the annular portion 3 of the glass handle, the member 6 is first positioned in the opening. The boss 16 of this member 6 has a notch 19 formed in its periphery. One end and one side of this notch are open, as indicated in Figure 2. The annular portion 3 of the glass handle 2 is provided with a lug 20 which projects into the opening 4, as illustrated best in Figure 3. When the member 6 is positioned in the opening 4, the lug 20 is adapted to project into the notch 19. This will prevent rotation of the member 6 in the opening and will facilitate application of the other member 5 to the handle. The boss 16 on the member 6 extends into the opening 4 and since it is just slightly less in diameter than the opening 4, it will serve to center the member 6 relative to the opening.

The member 5 is next positioned on the handle structure. In doing this, the end of the screw 12 is inserted in the socket 18 formed in member 6. Then it is merely necessary to rotate the member 5 in the proper direction. This will cause the screw to thread into the socket 18 and to draw the member 5 inwardly. The member 5 should be drawn inwardly until the annular portion 3 of the handle is tightly gripped between the portions of the members 5 and 6 which contact therewith, as illustrated in Figure 4. It will be noted that members 5 and 6 are of such dimensions relative to each other that when the handle structure is positioned in the opening 4 and tightly grips the portion 3 of the glass handle, the members 5 and 6 do not contact with each other but, on the other hand, are in spaced relationship. This insures that the members 5 and 6 will tightly grip the glass handle and my handle structure will not be loose in the opening 4. As previously indicated, during the time the member 5 is being rotated relative to the member 6, the lug 20 on the handle portion 3 and the notch 19 in member 6 will cooperate to prevent rotation of the member 6 in the opening 4.

The composite handle structure produced by mounting my handle structure on the glass handle is illustrated in Figure 1. It will be noted that my handle structure imparts to the glass handle 2 a much more pleasing appearance. This is especially true if the members 5 and 6 are made in colors. It will also be noted that because the members 5 and 6 are provided, there results a button-like structure having a larger gripping surface than the annular portion 3 of the handle provides when used alone. The fact that the outer surfaces of the members 5 and 6 are concave, facilitates gripping of the handle structure.

In Figures 5, 6, and 7, I have illustrated a slightly different type of handle structure. This handle structure is made of two pieces, 21 and 22. These pieces may be made of any suitable material but are preferably of different material than the glass article to which they are applied. For example, they may be of bakelite.

The portion 21 comprises a button portion 23 having a bevelled edge 24 and having a substantially cylindrical portion 25 extending from the outer surface thereof a substantial distance. This portion 25 is of much less diameter than the portion 23. It is rounded at its outer end as at 26. The inner surface of the portion 23 has a centrally disposed cylindrical boss 27 formed thereon. A screw 28 is inserted in a socket disposed centrally of the boss 27 and is held therein in any suitable manner. This screw projects from the boss a considerable distance.

The member 22 is substantially the same as the member 21, having a button portion 29, a cylindrical extension 30 projecting from its outer surface and having a boss 31 on its inner surface. A threaded socket 32 is formed in the member 22 centrally of the boss 31 and is adapted to receive the screw 28.

I have illustrated this handle structure applied to an article 33, illustrated in Figure 5. This article 33 may be a glass article and has an integral glass handle 34. This handle 34 has an annular portion 35 which has a circular opening 36 formed therein. On the inner edge of this annular portion 35, a lug 37 is formed. This lug is adapted to cooperate with a notch 38, formed in the boss 31 of member 22, to prevent rotation of the member 22 during its application to the glass article.

In applying this handle structure to the handle 34, the member 22 is first positioned so that the boss 31 thereof will extend into the opening 36 of the handle 34. The boss 31 is just slightly less in diameter than the opening 36 and will center the member 22 relative to said opening. The lug 37 on the glass handle will extend into the notch 38 and the boss 31 and will prevent rotation of the member 22. The member 21 is then mounted on the handle by inserting the screw 28 in the socket 32 and rotating the member 21 in the proper direction. This will cause the screw 28 to thread into the socket 32 and to move the portion 23 of member 21 towards the portion 29 of member 22. The two buttons 23 and 29 will grip the sides of the annular portion 35 of the glass handle, as illustrated in Figure 7. However, the bosses 27 and 31 will never contact with each other in order to insure that the members 21 and 22 may be adjusted relative to each other in such a manner that the glass handle will be tightly gripped therebetween.

It will be apparent that this handle structure will cooperate with the glass handle to produce a composite handle of pleasing appearance. The ornamental characteristic of this handle may be enhanced by making the members 21 and 22 in colors. The portions 25 and 30 extend laterally in opposite directions for considerable distances and serve as finger grips.

It will be apparent from the above description that I have provided a handle structure having many advantages. Although I have described it as being applicable to glassware, it is to be understood that it may be applied to other types of ware, for example, to china ware. It may even be applied to ware of an entirely different nature.

The handle structure which I have provided may be easily attached to ordinary glassware handles in order to impart to the handles a much more pleasing appearance and in order to produce a composite handle structure which can be more readily gripped than the ordinary handle structure. Furthermore, it may be easily and quickly removed from the article, if desired. No special construction is required on the glass article in order to render my handle structure applicable thereto with the exception of the small lug, which prevents rotation of one of the parts. This lug can be easily produced. If it is desired to use the glass article without my handle structure, it may be readily removed therefrom and the glass handle will have the ordinary appearance. It may be replaced with a handle structure of different color or of different shape. Thus, a different appearance may be imparted to the glass article merely by removing my handle structure or by replacing it with a handle structure of different color or shape. Although my handle structure is preferably removable, in certain cases it may be desirable to put cement on the screw connection in order to join the two parts together in such a manner that they may not be readily separated. Although in the preceding description I specify that the two parts of my handle structure are secured together by a screw, it will be apparent that various other types of securing means may be employed for this purpose.

My handle structure, as previously indicated, is preferably made of molded plastic material. Since it is made of such material, there will be no danger of injury to the glass handle. Furthermore, since it is made of molded plastic material, the screw which joins the two parts of the handle structure together may be readily mounted in one part of the handle structure. The handle structure may, however, be made of metal, wood or any other suitable material.

In the preceding description I specify that my handle structure is applied to a sugar bowl or cream pitcher. However, it is to be understood that I do not intend to be limited thereby, since my handle structure is readily applicable to a number of different types of glass articles. Also, although I specify that the portions of my handle structure are of button-like form, it is to be understood that such portions may be of any shape desired.

Many other advantages will be apparent from the description and drawing and from the following claim.

Having thus described my invention what I claim is:

In combination an article of the type described having a handle secured thereto, said handle having a circular aperture formed therein, and a handle structure detachably secured in said aperture, said handle structure being formed of a pair of members which are adapted to grip said handle, one of said members having a circular portion extending into said aperture, a threaded member for securing said members together, the circular portion of the said member which extends into said aperture having a notch in its periphery which cooperates with a lug projecting inwardly from the edge of the aperture in said handle to prevent rotation of said member relative to said handle.

WALTER VON NESSEN.